United States Patent
Eleftheriou et al.

(10) Patent No.: US 9,845,729 B2
(45) Date of Patent: Dec. 19, 2017

(54) METHOD OF MANUFACTURING RECUPERATOR AIR CELLS

(71) Applicant: PRATT & WHITNEY CANADA CORP., Longueuil (CA)

(72) Inventors: Andreas Eleftheriou, Woodbridge (CA); Daniel Alecu, Toronto (CA); David Menheere, Norval (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 614 days.

(21) Appl. No.: 14/048,186

(22) Filed: Oct. 8, 2013

(65) Prior Publication Data

US 2015/0099453 A1    Apr. 9, 2015

(51) Int. Cl.

| | |
|---|---|
| *F02C 7/08* | (2006.01) |
| *B21D 15/12* | (2006.01) |
| *B21D 53/06* | (2006.01) |
| *F28D 7/00* | (2006.01) |
| *F28D 7/08* | (2006.01) |
| *F28F 1/02* | (2006.01) |
| *F28D 21/00* | (2006.01) |

(52) U.S. Cl.
CPC ............... *F02C 7/08* (2013.01); *B21D 15/12* (2013.01); *B21D 53/06* (2013.01); *F28D 7/0041* (2013.01); *F28D 7/082* (2013.01); *F28D 21/001* (2013.01); *F28F 1/02* (2013.01); *F28D 2021/0026* (2013.01); *Y10T 29/49357* (2015.01)

(58) Field of Classification Search
CPC ........................................................ F02C 7/08

USPC ..................................................... 454/284, 71
See application file for complete search history.

(56) References Cited

U.S. PATENT DOCUMENTS

| | | |
|---|---|---|
| 3,483,920 A | 12/1969 | Heyn et al. |
| 3,662,582 A | 5/1972 | French |
| 5,501,270 A | 3/1996 | Young et al. |
| 5,505,256 A | 4/1996 | Boardman et al. |
| 5,704,123 A | 1/1998 | Paulman et al. |
| 5,730,213 A | 3/1998 | Kiser et al. |
| 6,151,949 A | 11/2000 | Young |
| 6,167,954 B1 | 1/2001 | Martins |
| 6,249,968 B1 | 6/2001 | Young |
| 6,273,183 B1 | 8/2001 | So et al. |
| 6,656,409 B1 * | 12/2003 | Keicher et al. ............... 264/401 |
| 6,811,744 B2 * | 11/2004 | Keicher et al. ................... 419/5 |
| 7,871,578 B2 * | 1/2011 | Schmidt ........................ 422/198 |
| 8,240,365 B2 | 8/2012 | Obana et al. |
| 2005/0081379 A1 | 4/2005 | Askani et al. |
| 2006/0236544 A1 * | 10/2006 | Huskamp et al. .......... 29/897.3 |
| 2007/0084593 A1 | 4/2007 | Besant et al. |
| 2008/0241765 A1 * | 10/2008 | Wood ............................. 430/326 |
| 2010/0029189 A1 * | 2/2010 | Wood ............................... 454/76 |
| 2010/0089560 A1 | 4/2010 | Shikazono et al. |
| 2012/0111548 A1 | 5/2012 | Toparkus et al. |

(Continued)

*Primary Examiner* — Steven B McAllister
*Assistant Examiner* — Samantha Miller
(74) *Attorney, Agent, or Firm* — Norton Rose Fulbright Canada LLP

(57) ABSTRACT

A method of manufacturing a recuperator segment uses metal tubes deformed into air cells in a waved configuration. The air cells are stacked one to another to form a double skinned recuperator segment providing cold air passages through the respective air cells and hot gas passages through spaces between adjacent air cells.

10 Claims, 6 Drawing Sheets

(56) References Cited

U.S. PATENT DOCUMENTS

2013/0075070 A1 3/2013 Home
2013/0098590 A1 4/2013 Nitta et al.

* cited by examiner

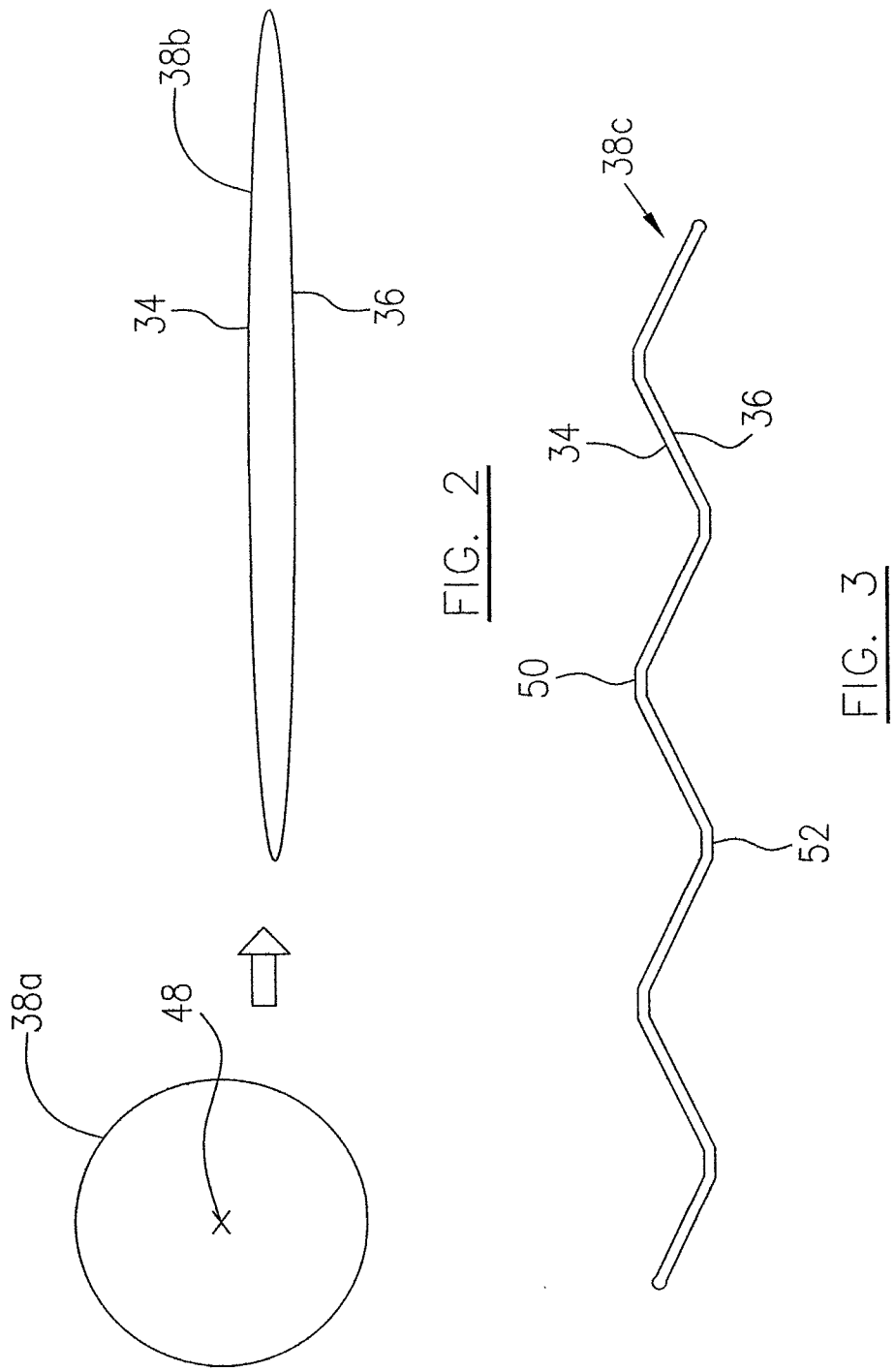

METHOD OF MANUFACTURING RECUPERATOR AIR CELLS

TECHNICAL FIELD

The application relates generally to gas turbine engines and, more particularly to a turbine engine heat recuperator of a gas turbine engine.

BACKGROUND OF THE ART

Gas turbine engines with heat exchanging recuperators are well known in the prior art. A recuperator is a heat exchanger which utilizes hot exhaust gases from the turbine to heat the compressed air input from the compressor, prior to injection of the compressed air into the combustion chamber. Preheating the compressed air improves fuel efficiency of the engine in a number of ways. Recuperators may be conventionally made from stacked plates by joining press-formed plates to form air cells through which the compressed air is channeled. In conventional manufacturing procedures, two formed plates are usually brazed or welded or otherwise mechanically joined together to form one air cell. It is desirable to keep the thickness of the plates as small as possible to minimize engine weight, but it is very challenging to build an air cell using foils having a thickness of less than 0.127 mm (0.005 inches). The difficulties associated with this conventional method include achieving a structurally sound brazed joint without air leakages. Therefore, efforts have been made to seek new methods for manufacturing recuperator air cells in order to overcome the shortcomings of the conventional recuperator air cell manufacturing procedures.

SUMMARY

In one aspect, there is provided a method of manufacturing a recuperator segment, comprising: a) plastically deforming a plurality of metal tubes, each tube being deformed into an air cell having top and bottom skins to define opposed closed sides and opposed open ends, each of the air cells having a waved configuration including a plurality of wave tops and wave bottoms alternately formed in two directions; b) stacking the air cells one upon another to form a double skinned wall configuration of the recuperator segment such that the wave bottoms of one of the air cells are supported on the wave tops of an adjacent one of the air cells, thereby providing cold air passages defined in the respective air cells and extending through the recuperator segment, and thereby forming hot gas passages through the recuperator segment between the adjacent air cells; and c) retaining the stacked air cells in position.

In another aspect, there is provided a recuperator segment comprising a plurality of double skinned walls, each of the walls having a top skin and a bottom skin spaced apart from each other to define an air cell in a seamless hollow structure including opposed closed sides and opposed open ends, the air cell having a longitudinal axis extending between the opposed open ends, and having a waved configuration including a plurality of wave tops and wave bottoms alternately formed in two directions, the double skinned walls being stacked with the wave bottoms of one air cell supported on the wave tops of an adjacent air cell in order to form said recuperator segment wherein the air cells provide cold air passages defined in and extending through the respective double skinned walls between the opposed open ends of the respective air cells and wherein spaces between adjacent ones of the double skinned walls provide hot gas passages extending through the recuperator segment between the opposed sides of the respective air cells.

DESCRIPTION OF THE DRAWINGS

Reference is now made to the accompanying figures in which:

FIG. 2 is a schematic illustration of one step of a manufacturing process of a recuperator air cell wherein a tube is deformed into a substantially flat form;

FIG. 3 is a schematic transverse cross-sectional view of the tube of FIG. 2 after a further step of the manufacturing process of the recuperator air cell;

It will be noted that throughout the appended drawings, like features are identified by like reference numerals.

DETAILED DESCRIPTION

Figure 1:
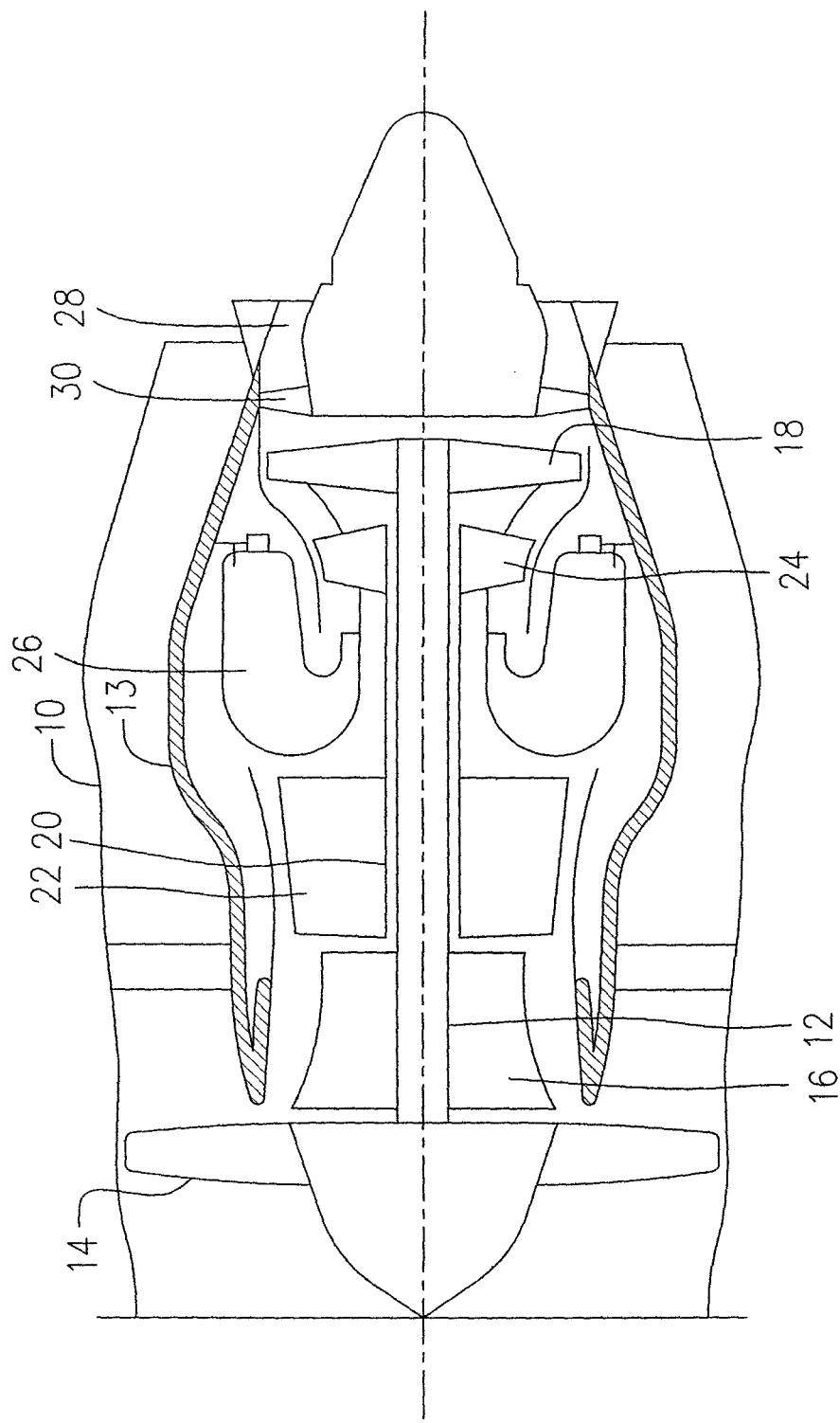
FIG. 1 is a schematic side cross-sectional view of a gas turbine engine illustrating an application of the described subject matter.

FIG. 1 illustrates a gas turbine engine 10 as an example of application of the described subject matter including a housing or nacelle annular outer case 10, an annular core casing 13, a low pressure spool assembly (not numbered) which includes a fan assembly 14, a low pressure compressor assembly 16 and a low pressure turbine assembly 18 connected together by a shaft 12, and a high pressure spool assembly (not numbered) which includes a high pressure compressor assembly 22 and a high pressure turbine assembly 24 connected together by a hollow shaft 20 which is positioned coaxially around the shaft 12. The core casing 13 surrounds the low and high pressure spool assemblies in order to define a main fluid path (not numbered) therethrough. In the main fluid path there is provided an annular combustor 26 to constitute a gas generator section. An annular exhaust duct 28 is provided to form a downstream end of the main fluid path. However, the subject matter described hereinafter may also be applicable to gas turbine engines of other types.

Referring to FIGS. 1 and 4-9, a turbine engine heat recuperator 30 is provided for recovering heat energy from turbine exhaust gases passing through the annular exhaust duct 28, for preheating compressor air which is supplied to the combustor 26 for combustion via compressor air flow passages (not shown) extending through the heat recuperator 30. Application of such a heat recuperator 30 in the engine exhaust duct 28 is described in Applicant's co-pending U.S. patent application entitled TURBINE ENGINE HEAT RECUPERATOR SYSTEM, application Ser. No. 13/435, 051, filed by ELEFTHERIOU et al. on Mar. 30, 2012, which is incorporated by reference herein. Such a recuperator is also described in Applicant's co-pending U.S. patent application entitled TURBINE ENGINE HEAT RECUPERATOR PLATE AND PLATE STACK application Ser. No. 13/365,711, filed by ELEFTHERIOU et al. on Feb. 3, 2013, which is incorporated by reference herein. However, the heat recuperator 30 in this described subject matter has a structure and is made in a manufacturing process different from the recuperators of the above mentioned references.

The heat recuperator 30 according to one embodiment, may include one or more recuperator segments 32 of a double skinned wall configuration. The recuperator segment 32 may include a plurality of double skinned walls (three are shown, but more could be included). Each double skinned wall has a top skin 34 and a bottom skin 36 spaced apart from each other to define an air cell 38 which includes opposed enclosed sides 40, 42 (see FIG. 4) and opposed open ends 44, 46 (see FIG. 6). The air cell 38 has a longitudinal axis 48 (only one shown) extending between the opposed open ends 44, 46 and forms a hyperbolic shape pattern having a waved configuration including wave tops 50 and wave bottoms 52 alternately formed in two directions, for example in both longitudinal and transverse directions with respect to the longitudinal axis 48.

In such a waved configuration, the double skinned wall (air cell 38) may be formed with discrete wave tops 50 and wave bottoms 52 distributed such that each one of the wave tops 50 is positioned with four immediately adjacent wave bottoms 52 (see FIG. 9), with the exception of the wave tops 50 located at the opposed sides 40, 42 and the opposed ends 44, 46 of the air cell 38. In this embodiment, one of the wave tops 50 is located longitudinally between two immediately adjacent wave bottoms 52 and transversely between two immediately adjacent wave bottoms 52. Similarly, each one of the wave bottoms 52, except those located at the opposed sides 40, 42 and opposed ends 44, 46, is positioned with four immediately adjacent wave tops 50. In this embodiment, one of the wave bottoms 52 is located longitudinally between two immediately adjacent wave tops 50 and transversely between the other two immediately adjacent wave tops 50.

Figure 8:
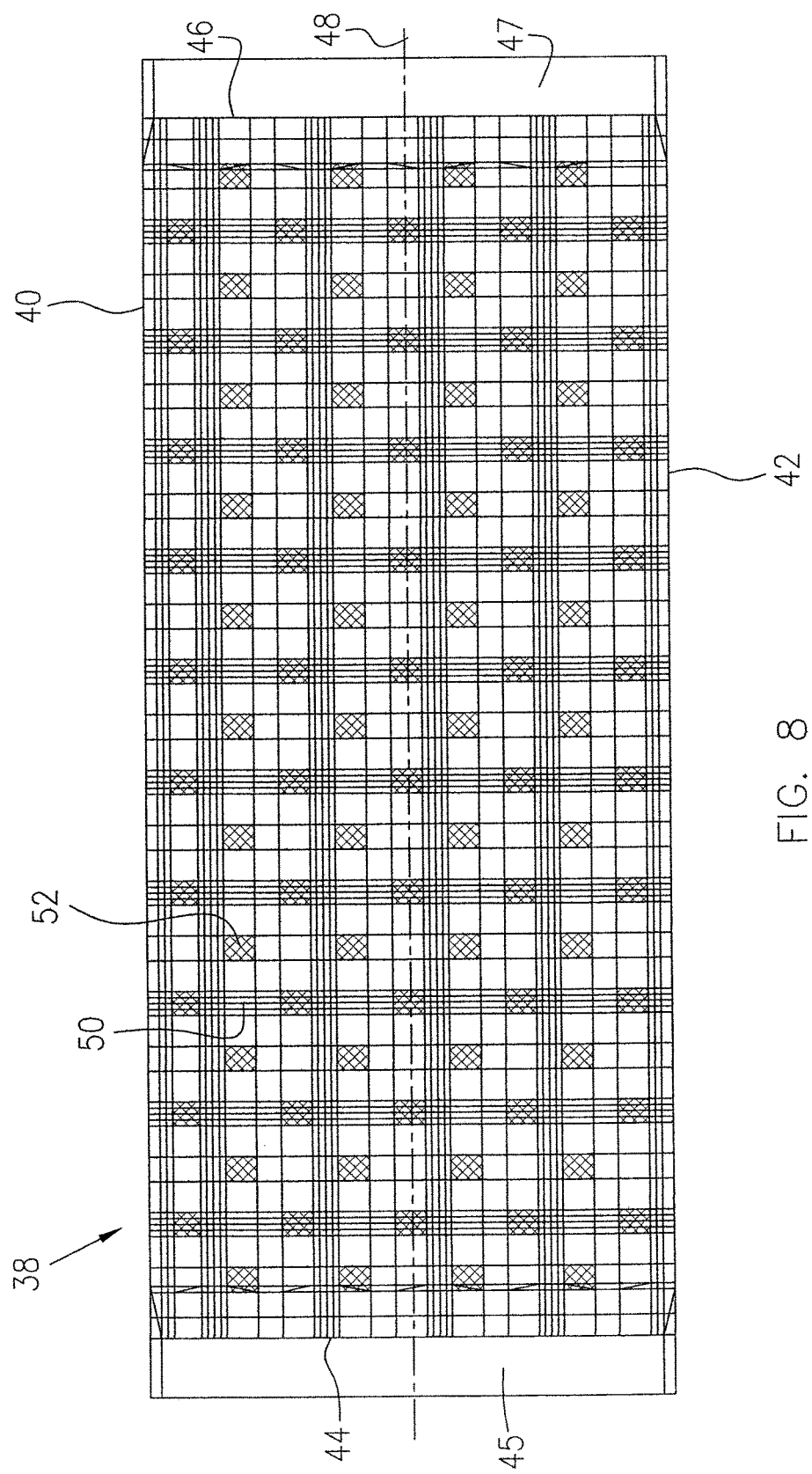
FIG. 8 is a top plan view of the recuperator air cell of FIG. 4.
Figure 9:
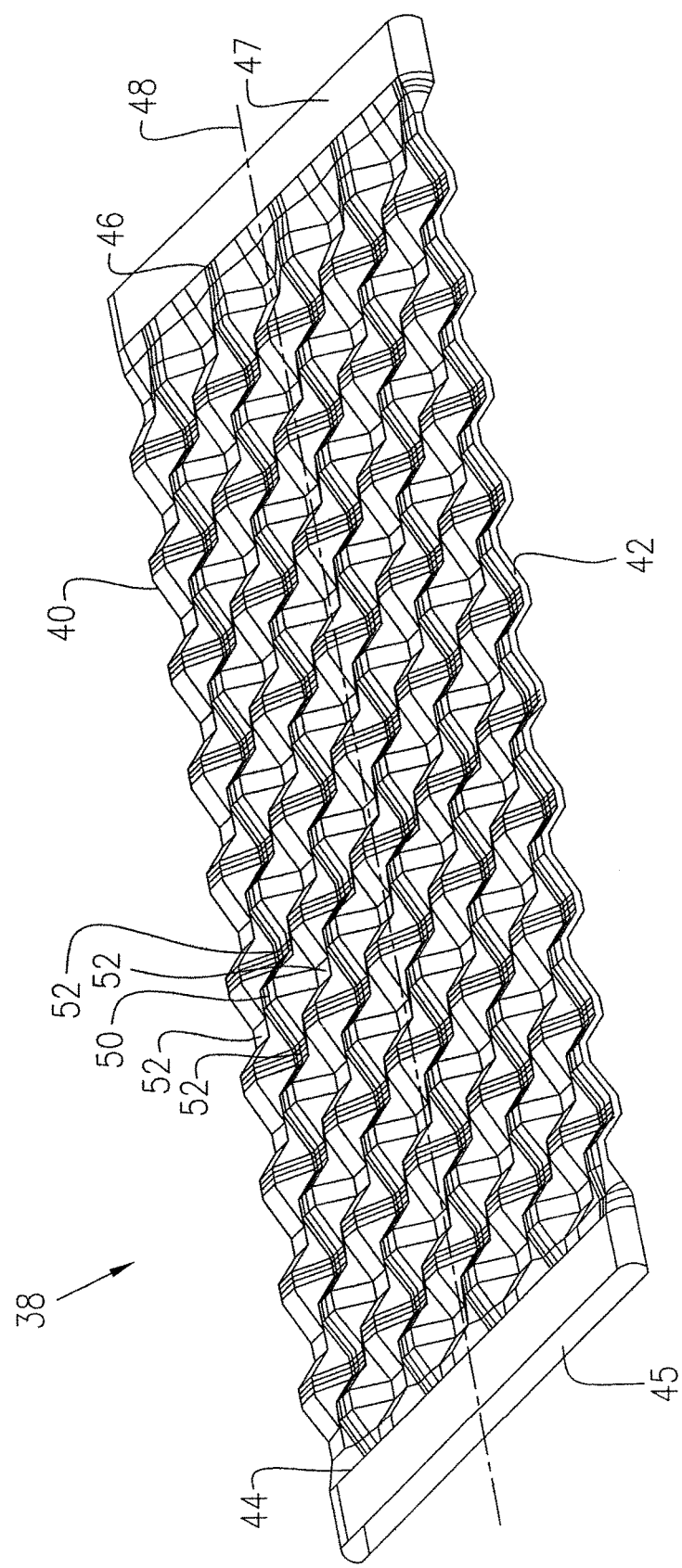
FIG. 9 is an isometric view of the recuperator air cell of FIG. 4.

An inlet 45 and an outlet 47, which may extend across a transverse length between opposed sides 40, 42 of the air cell 38, may be attached to the respective open ends 44, 46 of the air cell 38, as shown in FIGS. 8 and 9. It should be noted that the inlet opening 45 and outlet 47 could also be formed during manufacturing as an integral part of the cell and the manifolds 58 are attached after.

The recuperator segment 32 is formed with a plurality of air cells 38 (double skinned walls) in a stacked configuration. The air cells 38 (double skinned walls) are stacked with the wave bottoms 52 of one air cell 38 supported on the wave tops 50 of an adjacent air cell 38 to form such a recuperator segment 32. In the recuperator segment 32, the air cells provide cold air passages 54 extending through the respective air cells 38 (double skinned walls) between the open ends 44, 46 (or inlet 45 and outlet 47) for receiving the compressor air flow to be preheated from the direction of the longitudinal axis 48. Spaces between adjacent ones of the air cells 38 (double skinned walls) include rooms around the contacted wave tops 50 and bottoms 52 of the adjacent air cells 38, the rooms being communicated one with another. Therefore, the spaces between adjacent ones of the air cells 38 provide hot gas passages 56 extending through the recuperator segment 32 between the opposed sides 40, 42 of the air cells 38 for receiving exhausted hot gases from the transverse direction such that compressor air flow is preheated as it passes through cold air passages 54 by hot air passing through the hot air passages 56.

Optionally, the wave tops 50 and wave bottoms 52 of each of the air cells 38 may be substantially flat such that the air cells 38 (double skinned walls) may have a more stable stacked pattern.

Figure 4:
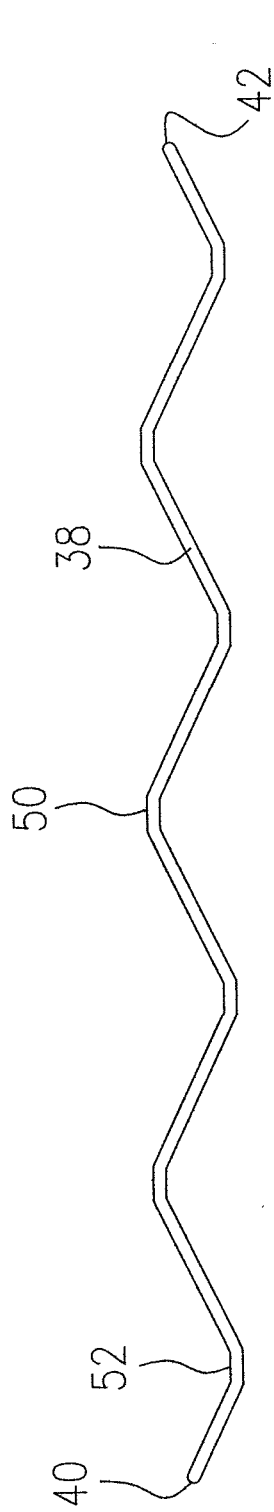
FIG. 4 is schematic transverse cross-sectional view of a recuperator air cell formed after a still further step of the manufacturing process of the recuperator air cell.

A recuperator segment manufacturing process may be used to manufacture the recuperator segment 32 according to one embodiment of the described subject matter in which each of the air cells 38 (double skinned walls) is made from a metal tube rather than conventional metal plates, thereby eliminating brazing or welding in the manufacturing process of air cells. In FIGS. 2-4, metal tube 38a (only one shown) selected to make the individual air cells 38 (double skinned walls) may have a tube wall thickness of 0.0254 mm (0.001 inches)-0.203 mm (0.008 inches). The tube 38a may be cut to a required length (i.e. a length of the longitudinal dimension of the recuperator segment 32). If the tube 38a is made in a seamless formation process, the air cell 38 will also be a seamless hollow structure. The tube 38a may be selected to have a round cross-section and the tube diameter may be selected such that the finished air cell 38 meets the surface area requirements of the recuperator segment design. A central axis of the tube 38a becomes the longitudinal axis 48 when the tube 38a is deformed into the air cell 38 and therefore is also marked as axis 48 in FIG. 2.

The tube 38a cut in the required length is then deformed or pressed into a substantially flat tube 38b having an elliptic cross-section as shown in FIG. 2. The circular wall of the tube 38a now becomes the top skin 34 and bottom skin 36 which are substantially flat in this step.

The substantially flat tube 38b is then pressed, for example in a die (not shown) by a hydroforming method, such that the top and bottom skins 34, 36 are pressed against each other and are simultaneously formed in a required corrugated shape as shown in FIG. 3. In this step, the substantially flat tube 38b becomes a double skinned wall 38c in the required waved configuration in which the wave bottoms 52 and wave tops 50 are optionally flat. However, at this stage in the manufacturing process, the double skinned walls 38c in the waved configuration do not form a hollow structure to provide a required air cell passage due to the close contact of the top and bottom skins 34, 36. Therefore, in a further step, pressurized fluid may be forced between the top and bottom skins 34, 36 to internally pressurize the double skinned wall 38c in a shaped die cavity, resulting in the top and bottom skins 34, 36 being deformed to be spaced apart from each other in a predetermined dimension in order to form the air cell 38 having the waved configuration as shown in FIG. 4.

Figure 5:
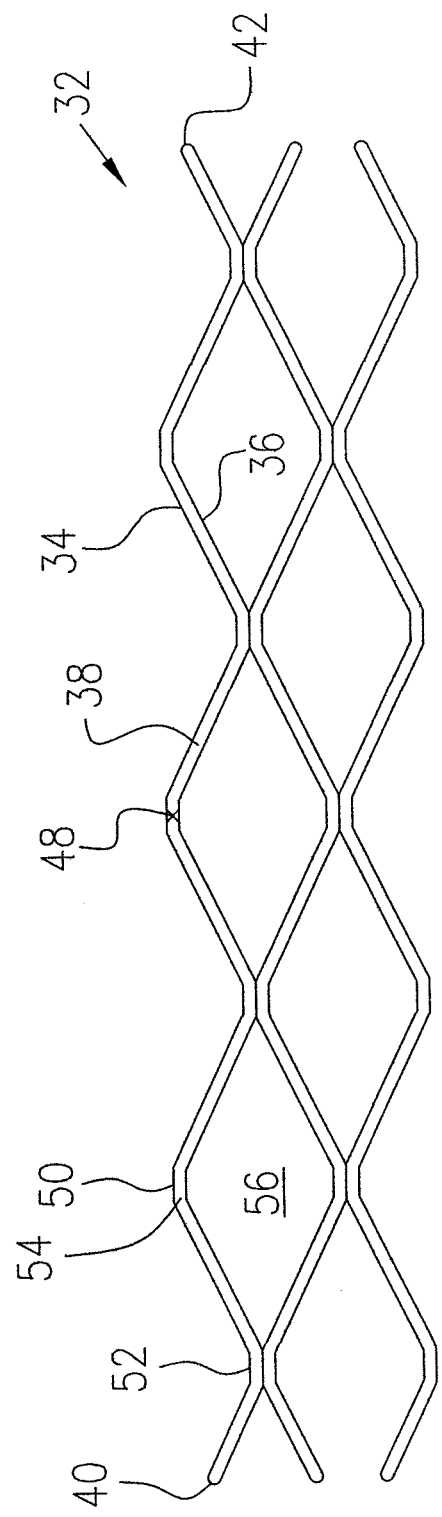
FIG. 5 is a schematic and partial transverse cross-sectional view of a recuperator segment made of the recuperator air cells of FIG. 4.
Figures 6, 7:
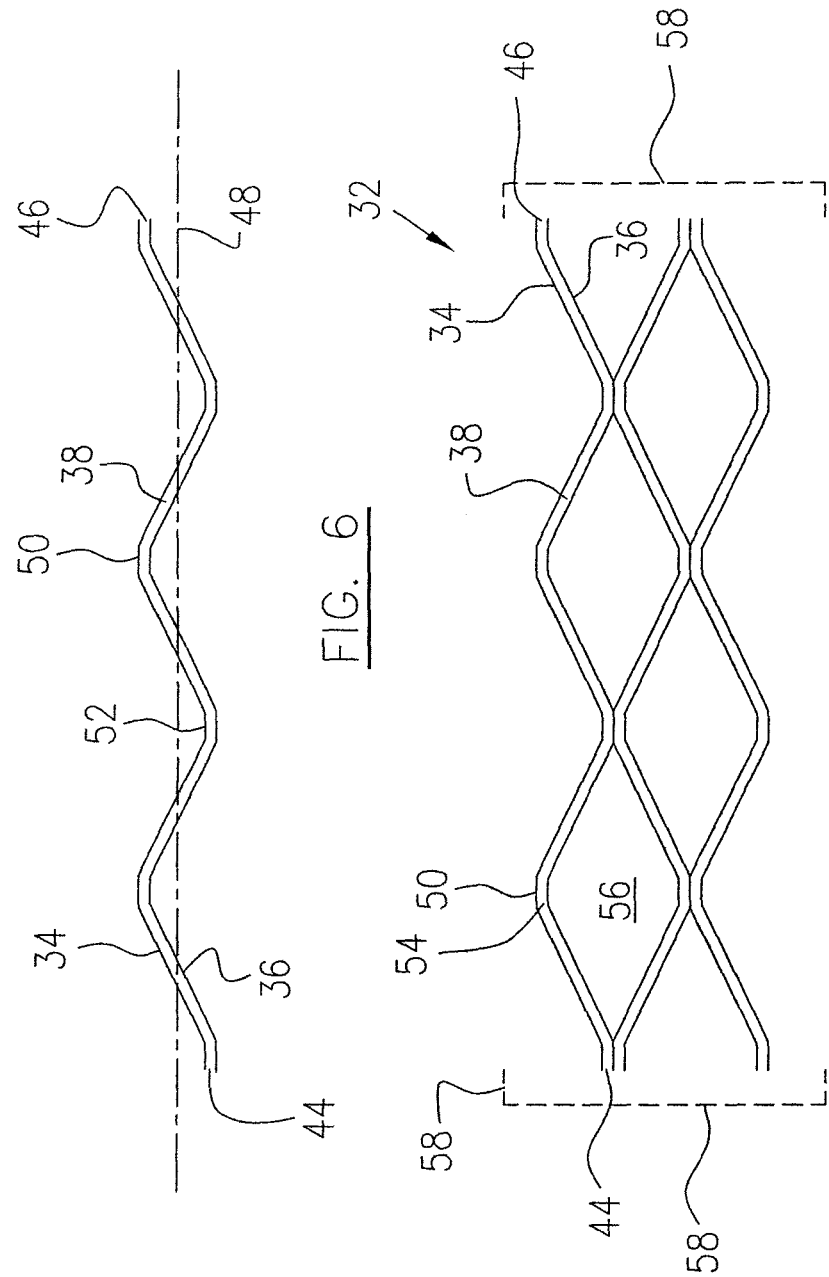
FIG. 6 is a schematic longitudinal cross-sectional view of the recuperator air cell of FIG. 4.
FIG. 7 is a schematic longitudinal cross-sectional view of the recuperator segment of FIG. 5.

As illustrated in FIGS. 5 and 7, the air cells 38 (double skinned walls) prepared in the previous steps are stacked together, one upon another to form the required double skinned configuration of the recuperator segment 32 such that the wave bottoms 52 of one of the air cells 38 (double skinned walls) are supported on the wave tops 50 of an adjacent one of the air cells 38 (double skinned walls).

The stacked air cells 38 (double skinned walls) which form the recuperator segment 32, may be retained in position by a retaining apparatus schematically illustrated by broken lines 58 in FIG. 7, which may be a housing of the recuperator 30 for containing one or more recuperator segments 32 therein to form the recuperator 30. The retaining apparatus 58 may alternatively be connectors or brazed manifolds which provide respective inlet and outlet passages in fluid communication with the respective cold air passages 54 of the recuperator segment 32. For example, the inlets 45 and outlets 47 of the stacked air cells 38 may form part of respective such manifolds. The retaining apparatus 58 may also be other types of applicable retaining devices.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A method of manufacturing a heat recuperator segment, comprising:
   a) providing a plurality of metal tubes having an initial cross-sectional area;
   b) in a pressing process plastically deforming each of the plurality of metal tubes, including flattening each metal tube into an air cell having a flattened cross-sectional area different from the initial cross-sectional area, each air cell having top and bottom skins to define opposed closed sides and opposed open ends, each of the air cells defining a double skinned wall having a waved configuration including a plurality of wave tops and wave bottoms alternately formed in two directions;
   c) stacking the air cells one upon another to form a stacked double skinned wall configuration of the recuperator segment such that the wave bottoms of one of the air cells are supported on the wave tops of an adjacent one of the air cells, thereby providing cold air passages defined in the respective air cells and extending through the recuperator segment, and thereby forming hot gas passages through the recuperator segment between the adjacent air cells; and
   d) retaining the stacked air cells in position.

2. The method as defined in claim 1 wherein step (b) is conducted such that the wave tops and wave bottoms are alternately positioned in both transverse and longitudinal directions of the tube.

3. The method as defined in claim 1 wherein step (b) is conducted such that one of the wave tops is positioned adjacent four of the of the wave bottoms, and one of the wave bottoms is positioned adjacent four of the wave tops.

4. The method as defined in claim 1 wherein step (b) is conducted by first pressing each metal tube into a substantially flat form having an elliptical cross-section and then further deforming the tube of substantially flat form into the waved configuration.

5. The method as defined in claim 1 wherein step (b) is conducted by pressing each tube such that the top and bottom skins are positioned against each other, the top and bottom skins thereby simultaneously forming a required corrugated shape, and then internally pressurizing the tube to re-position the top and bottom skins to be spaced apart from each other in a predetermined dimension in order to form the air cell having the waved configuration.

6. The method as defined in claim 1 wherein step (b) is conducted by deforming each tube into the waved configuration such that the wave tops and wave bottoms are substantially flat.

7. The method as defined in claim 6 wherein step (c) is conducted by placing the substantially flat wave bottoms of at least one air cell upon the substantially flat wave tops of an adjacent one of the air cells.

8. The method as defined in claim 1 further comprising a step of selecting tube diameters to meet a required surface area of each air cell.

9. The method as defined in claim 1 further comprising a step of selecting tubes having a tube wall thickness in a range between 0.0254 mm (0.001 inches) and 0.203 mm (0.008 inches).

10. The method as defined in claim 1 further comprising a step of preparing the tubes to have a length to meet a required length of the recuperation segment.

* * * * *